Patented May 17, 1938

2,118,001

UNITED STATES PATENT OFFICE 2,118,001

PROCESS FOR HYDROGENATING CARBONYL COMPOUNDS AND CATALYST THEREFOR

Chester E. Andrews, Overbrook, and Lloyd W. Covert, Philadelphia, Pa., assignors to Röhm & Haas Company, Philadelphia, Pa.

No Drawing. Application February 20, 1935, Serial No. 7,354

10 Claims. (Cl. 260—127)

This invention relates to catalysts which may be used in the hydrogenation of various organic compounds. It relates more particularly to catalysts which contain the oxides of copper and aluminum with or without the addition of small amounts of other difficultly reducible metal oxides, particularly those of the alkali and alkaline earth metals.

It is known that several metals, such as nickel, copper, platinum, etc., when in suitable form may be used as catalysts in a wide variety of hydrogenation processes. We have found that copper oxide under certain conditions has many important and particular advantages over metallic copper for certain hydrogenation reactions. We have also found that the life of copper oxide catalysts can be greatly prolonged by incorporating in them difficultly reducible metal oxides such as those of aluminum, chromium, silicon, barium, etc. Of these difficultly reducible oxides which may be incorporated with the copper oxide in order to stabilize or promote its effectiveness, aluminum oxide has particular merit.

The catalysts containing the oxides of copper and aluminum with or without the addition of other difficultly reducible metal oxides may be used directly or on carriers and are suitable for batch processes and for use in continuous flow systems. When used in batch processes it is desirable to have the catalyst in a finely divided condition, where for continuous flow systems pieces sufficiently large to prevent the catalyst from being carried out of the catalyst chamber are preferable.

These catalysts may be prepared in any suitable manner and the method will depend on the form in which the catalyst is to be used. They may be prepared by igniting together salts of copper and aluminum, with or without other metal salts, which on ignition will yield the oxides of the metals. For this purpose the nitrates serve very well. The heating is continued at a sufficiently high temperature until all of the salt has been converted to the oxide. They may also be prepared by coprecipitating the hydroxides from a solution containing the desired metals and then heating the precipitate to produce the mixed oxides. If it is desired to prepare a supported catalyst the hydroxides may be precipitated on the support and subsequently ignited. Other compounds such as the carbonates may also be precipitated on the support and subsequently ignited. The supporting material may also be treated with a solution of soluble salts of the metals which yield oxides on ignition, and after evaporating the water, igniting the whole mass so as to form the oxides of the catalytic metals. The supports may be pumice, infusorial earth, silica, etc.

We have also found that aluminum oxide, besides having a beneficial effect on the life and effectiveness of the copper oxide catalyst, is itself an excellent support particularly when in the so-called "activated" form.

Our preferred catalyst is one in which the aluminum oxide is present in this activated form, and in which the aluminum oxide performs the double function of a carrier and a stabilizing component of the catalyst. Such catalysts may be prepared by treating activated alumina with a solution of the nitrates of the desired metals, evaporating and igniting the residue, or the hydroxides of the metal may be precipitated on the activated alumina and subsequently ignited. In these ways the copper oxide is intimately associated with the aluminum oxide and such catalysts give excellent results in various types of hydrogenation processes. This type of catalyst is to be preferred to one in which an inert material is used as the support.

We have found that the aluminum oxide now being sold under the name of "Activated Alumina" is particularly good for the preparation of these catalysts. It is a specially prepared, highly absorptive, partially dehydrated aluminum trihydrate containing approximately 91% $Al_2O_3$, the remainder being essentially water and a small amount of alkali. Other "activated aluminas" may also be used.

The catalysts described herein, containing essentially the oxides of copper and aluminum are particularly useful in the hydrogenation of esters or glycerides to alcohols, amides to amines, nitro compounds to amines, unsaturated compounds to saturated compounds etc. They are practically ineffective for the hydrogenation of the nucleus in aromatic compounds such as benzene and phenol. For this reason they can be used for the selective hydrogenation of many aromatic compounds such for instance, as the reduction of aromatic esters to the corresponding aromatic alcohols without any hydrogenation of the aromatic nucleus.

The following examples will illustrate the preparation and use of these catalysts, but are not intended to limit the invention to the details shown, since the processes involved may be otherwise carried out within the scope of the appended claims.

*Example 1.*—A catalyst consisting of copper oxide and aluminum oxide was prepared by spraying a solution of 127.6 grams of Cu(NO₃)₂.3H₂O in 500 cc. of water on 340 cc. of 12-20 mesh activated alumina in a heated pan. The mass was then heated to 600° C. in an electric furnace until the decomposition of the copper nitrate was complete.

The mixed lauryl esters of cocoanut oil fatty acids were passed over 300 cc. of this catalyst at 275° C. and 3100 lbs. per square inch hydrogen pressure in a suitable apparatus for 76 hours, at an average rate of 39.5 grams per hour. The product weighed 3000 grams, of which 95.0% consisted of the alcohols corresponding to the fatty acids of cocoanut oil.

With this same catalyst, cocoanut oil was passed over the catalyst at similar conditions for 198.5 hours, at an average rate of 43.8 grams per hour. The product weighed 8700 grams and was 75.8% hydrogenated to the alcohols.

Other esters or glycerides may be used and similar results obtained, for example, butyl stearate, lauryl stearate, palm oil, castor oil, and cottonseed oil, may be hydrogenated in a similar manner.

*Example 2.*—A solution of 48.5 grams of copper nitrate, 70.5 grams of aluminum nitrate, and 6.4 grams of barium nitrate in 200 cc. of water, was slowly evaporated to dryness and heated in an electric muffle furnace for 4 hours at 600° C. It was then finely ground. Two grams of this catalyst and 80 grams of the lauryl esters of mixed cocoanut oil fatty acids were placed in an agitated autoclave under a hydrogen pressure of 3100 lbs. per square inch, at 275° C. for 2 hours. The product contained 92% alcohols, corresponding to the fatty acids of cocoanut oil.

*Example 3.*—A solution of 63.8 grams of copper nitrate, 92.5 grams of aluminum nitrate, and 8.3 grams of barium nitrate in 500 cc. of water, was sprayed on 340 cc. of 12-20 mesh pumice in a heated pan. The resulting dry material was heated for 4 hours in an electric furnace at 600° C. The lauryl esters of cocoanut oil fatty acids were passed over 300 cc. of this catalyst at 275° C. and 3100 lbs. per square inch hydrogen pressure, at the rate of 39.3 grams per hour for 140 hours. The total product weighed 5490 grams and contained 85% alcohols, corresponding to the cocoanut oil fatty acids.

*Example 4.*—A catalyst consisting of copper oxide and aluminum oxide was prepared in the following manner. A solution of 50 grams of copper nitrate in 25 cc. of water was ground intimately with 50 grams of 180 mesh activated alumina. The material was dried by heating in an evaporating dish and was then heated for 4 hours at 600° C. in an electric furnace. The product was finely pulverized and was then ready for use. This catalyst was used in the hydrogenation of various organic compounds, of which the following are given as examples:

80 grams of acetone was completely reduced to isopropyl alcohol in 0.5 hour at 200° C. and 2000 lbs. per square inch hydrogen pressure in the presence of 6 grams of the catalyst.

80 grams of methyl hexyl ketone was completely reduced to methyl hexyl carbinol in 0.5 hour at 200° C. and 2000 lbs. per square inch hydrogen pressure, in the presence of 6 grams of the catalyst.

80 grams of diisobutylene was completely saturated at 200° C. and 2000 lbs. per square inch hydrogen pressure in 0.5 hour in the presence of 6 grams of the catalyst.

80 grams of nitrobenzene was completely reduced to aniline in 4 hours at 150° C. and 3100 lbs. per square inch hydrogen pressure in the presence of 6 grams of the catalyst.

14 grams of stearamide dissolved in 30 grams of dioxane was 76.5% hydrogenated to octadecyl amine in 2 hours at 250° C. and 3100 lbs. per square inch hydrogen pressure in the presence of 4 grams of the catalyst.

To illustrate that this catalyst is selective, in that it is not effective for the aromatic nucleus, 80 grams of phenol was subjected to hydrogenation at 200° C. and 2000 lbs. per square inch hydrogen pressure for 4 hours with 6 grams of the catalyst. No hydrogenation was obtained.

As already suggested the alumina can be in chemical combination with the other ingredients of the catalyst, or it can be in physical mixture, or it can serve simply as a support for the other catalytic materials. The elevated temperatures and pressures are ordinarily employed, but in some instances, for example, when methanol is used as the reducing agent in place of hydrogen, the reaction can be carried out in some instances at atmospheric pressure.

It is understood that the above examples are given only by way of illustration and not limitation, and that the scope of the invention is not limited except by the following claims.

The term "activated alumina" as used in the claims means that type of activated alumina which may be purchased in the open market and which is a partially dehydrated alumina trihydrate containing approximately 91 per cent. of Al₂O₃, the remainder being essentially water and a small amount of alkali.

We claim:

1. A catalyst for the hydrogenation of organic compounds comprising essentially activated alumina on which copper oxide has been deposited.

2. A catalyst for the hydrogenation of organic compounds comprising essentially activated alumina on which a mixture of copper oxide and chromium oxide has been deposited.

3. A catalyst for the hydrogenation of organic compounds comprising essentially activated alumina on which a mixture of copper oxide, barium oxide and chromium oxide has been deposited.

4. In a catalytic process of hydrogenating carbonyl compounds wherein the compound to be hydrogenated is treated at elevated temperatures and pressures with hydrogen in the presence of a catalyst, the improvement which consists in treating said compound with hydrogen in the presence of copper oxide deposited on activated alumina.

5. In a catalytic process of hydrogenating carbonyl compounds wherein the compound to be hydrogenated is treated at elevated temperatures and pressures with hydrogen in the presence of a catalyst, the improvement which consists in treating said compound with hydrogen in the presence of a mixture of copper oxide and chromium oxide deposited on activated alumina.

6. In a catalytic process of hydrogenating carbonyl compounds wherein the compound to be hydrogenated is treated at elevated temperatures and pressures with hydrogen in the presence of a catalyst, the improvement which consists in treating said compound with hydrogen in the presence of a mixture of copper oxide, barium oxide and chromium oxide deposited on activated alumina.

7. In a catalytic process of producing alcohols from esters of carboxylic acids wherein the ester is treated at elevated temperatures and pressures with hydrogen in the presence of a catalyst, the improvement which consists in treating the ester with hydrogen in the presence of copper oxide deposited on activated alumina.

8. In a catalytic process of producing alcohols from glycerides wherein the glyceride is treated at elevated temperatures and pressures with hydrogen in the presence of a catalyst, the improvement which consists in treating said glyceride with hydrogen in the presence of copper oxide deposited on activated alumina.

9. In a catalytic process of producing alcohols from ketones wherein the ketone is treated at elevated temperatures and pressures with hydrogen in the presence of a catalyst, the improvement which consists in treating said ketone with hydrogen in the presence of copper oxide deposited on activated alumina.

10. In a process of producing amines from acid amides wherein the amide is treated at elevated temperatures and pressures with hydrogen in the presence of a catalyst, the improvement which consists in treating said amide with hydrogen in the presence of copper oxide deposited on activated alumina.

CHESTER E. ANDREWS.
LLOYD W. COVERT.